J. B. WALKER.
TRACTOR WHEEL WEIGHT.
APPLICATION FILED MAR. 25, 1922.
1,423,054.
Patented July 18, 1922.
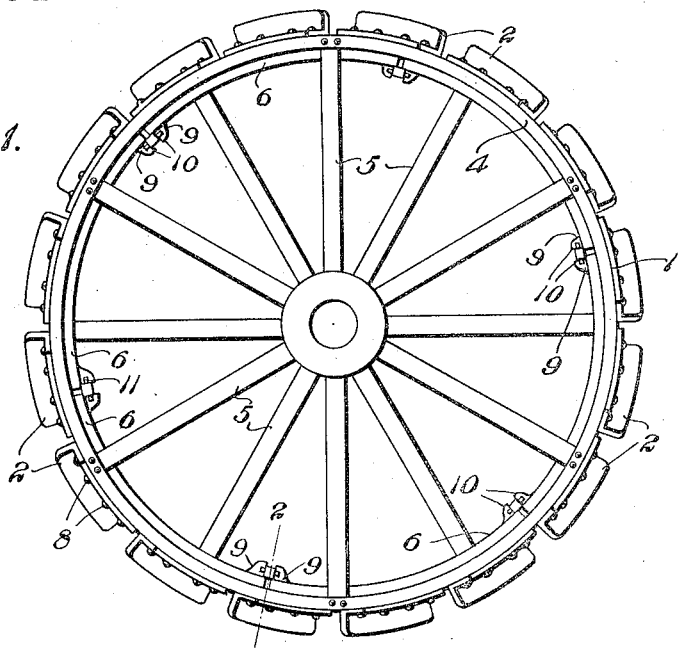
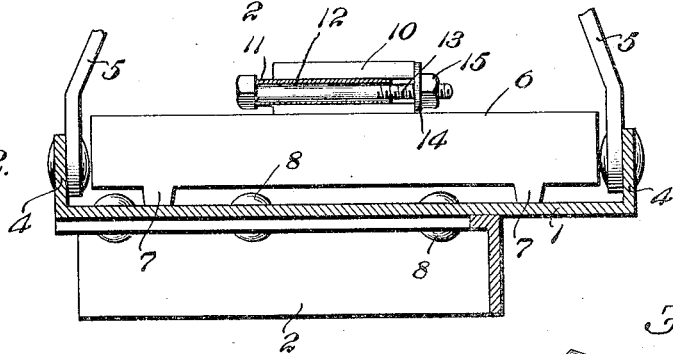
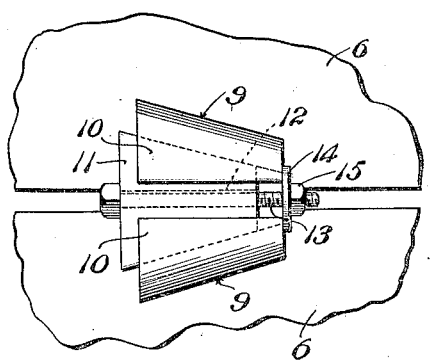
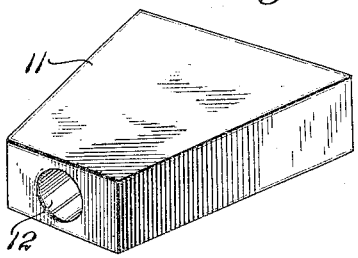
John B. Walker,
INVENTOR.
BY J. A. Bishop
ATTORNEY

UNITED STATES PATENT OFFICE.

JOHN B. WALKER, OF MINERVA, OHIO.

TRACTOR-WHEEL WEIGHT.

1,423,054.  Specification of Letters Patent.  Patented July 18, 1922.

Application filed March 25, 1922. Serial No. 546,591.

*To all whom it may concern:*

Be it known that I, JOHN B. WALKER, a citizen of the United States, residing at Minerva, in the county of Stark and State of Ohio, have invented a new and useful Tractor-Wheel Weight, of which the following is a specification.

This invention relates to tractor wheel weights, the principal object being to construct weights for this purpose, that may be readily attached to or detached from the wheels of a tractor without changing any of the standard parts of the said wheels or substituting new parts therefor.

Another object is the designing of the attaching means for the said weights so that the user may easily attach or detach them without the use of special tools or equipment of any description, the only tool necessary for the entire operation being an ordinary wrench.

A still further object is to generally simplify and improve this class of devices, thereby reducing the manufacturing cost and the time required to attach or detach them.

In the drawings;

Fig. 1 is a side elevation of a standard type of tractor wheel showing a set of my improved weights attached thereto.

Fig. 2 is an enlarged cross sectional view through the rim of the tractor wheel taken on the line 2—2 of Fig. 1 and showing one of my improved weights in position.

Fig. 3 is an enlarged, fragmentary, plan view of the adjacent ends of two of my weights with the locking wedge in place.

Fig. 4 is a perspective of one of the locking wedges.

In the construction of tractors and especially in the smaller types designed to be employed for general utility work in agriculture, the weight of a tractor cannot be made to exceed a certain point without limiting the scope of its use. On the other hand, it is frequently necessary to use the tractor for drawing heavy equipment or machinery and it is then found that the light weight of the tractor will cause its driving wheels to slip and lose traction.

I am aware that numerous attempts have been made to correct this insufficiency in small tractors by employing detachable weights which may be fastened to the wheels of the said tractors, but in the use of any of the weights heretofore designed, it is necessary to reconstruct or replace certain parts of the wheels in order to attach the weights and in some instances, the wheel must be practically rebuilt before the said weights can be secured.

At 1 I have shown a standard type of tractor wheel, the customary cleats 2 being shown thereon. The usual in-turned flanges 4 have the spokes 5 attached to them in the ordinary manner. The wheel weights, shown at 6, are designed to exactly fit the curvature of the wheel rim, ribs 7 being provided on the outer or under side of the said weights for the purpose of spacing them away from the rim a sufficient distance to clear the heads of the rivets 8 which secure the cleats 2. The ribs also serve to reinforce the rim and thereby prevent stones or other obstructions with which the wheel may come into contact, from denting or bending the said rim.

Adjacent either end of each weight section is formed an upwardly or inwardly extending lug 9 which extends from the upper or inner face of the weight and is then bent at a right angle and extends toward the adjacent weight end, as shown at 10. The portion 9 of the lug is at an angle to the end of the weight and, with the portion 9 of the lug on the adjacent end of the next weight section, forms a tapered or wedge shaped space. Into this space and beneath the portions 10 is driven a wedge 11, as best shown in Fig. 3. Extending centrally through the wedge is an aperture 12 which is designed to receive a bolt 13. A washer 14 contacts with the lugs at the smaller end of the wedge and is designed to receive the free end of the bolt, the head of which bears against the large end of the wedge. A nut 15 is then threaded on the free end of the bolt and, contacting with the outer face of the washer, will, when turned to feed up the threads toward the head of the said bolt, draw the wedge inwardly between the lugs.

In assembling my wheel weights, two of the weight sections are placed in position on the rim, the adjacent ends of the two sections being spaced a slight distance apart. A wedge is then placed between the lugs, a bolt inserted through the wedge and a washer placed on the free end of the bolt. The nut is then screwed on the bolt until it has drawn the wedge into contact with the lugs but without forcing the weights apart. The other weight sections are then each positioned in turn and a wedge inserted with its bolt therethrough. The washers and nuts are then placed on the bolts and the said nuts turned as tight as possible, thus drawing the wedges inwardly and forcing the weights against the rim. The sections are now locked one to the other and cannot be displaced without first removing the wedges.

It will be seen from the foregoing that the only tool necessary to attach or remove my weights from the tractor wheel is an ordinary wrench and that no substitution or changing of the wheel parts is in any way necessary.

Having now described my invention what I claim is:

1. A device of the character described comprising arcuate weight sections, lugs formed on said weight sections and means engaging said lugs for securing said weight sections in position.

2. A tractor wheel weight comprising a plurality of weight sections, lugs formed on said weight sections and means engaging said lugs for securing said sections together and to said wheel.

3. A tractor wheel weight comprising a plurality of weight sections and wedges arranged to secure said sections to said wheel.

4. A tractor wheel weight comprising a plurality of arcuate sections, a lug formed at either extremity of each of said sections, a wedge engaging the lug at the extremity of one section and the lug at the extremity of the adjacent section and securing said sections together and to said wheel.

5. A tractor wheel weight comprising a plurality of arcuate sections, lugs formed adjacent the ends of each of said sections, wedges inserted between adjacent pairs of lugs and means for drawing said wedges into engagement with said lugs and securing said sections together.

6. In a tractor wheel weight an arcuate weight section, lugs formed on said section and wedges designed to engage said lugs and secure said section to said wheel.

In testimony that I claim the above, I have hereunto subscribed my name.

JOHN B. WALKER.